(12) United States Patent
Imanaka

(10) Patent No.: US 10,651,476 B2
(45) Date of Patent: May 12, 2020

(54) CELL STACK DEVICE, MODULE, AND MODULE HOUSING DEVICE

(71) Applicant: Kyocera Corporation, Kyoto-shi, Kyoto (JP)

(72) Inventor: Kazuya Imanaka, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 124 days.

(21) Appl. No.: 15/747,798

(22) PCT Filed: Jul. 27, 2016

(86) PCT No.: PCT/JP2016/072042
§ 371 (c)(1),
(2) Date: Jan. 26, 2018

(87) PCT Pub. No.: WO2017/018455
PCT Pub. Date: Feb. 2, 2017

(65) Prior Publication Data
US 2018/0212251 A1     Jul. 26, 2018

(30) Foreign Application Priority Data
Jul. 29, 2015   (JP) .................................. 2015-149739

(51) Int. Cl.
*H01M 4/86*          (2006.01)
*H01M 8/2425*        (2016.01)
(Continued)

(52) U.S. Cl.
CPC ......... *H01M 4/861* (2013.01); *H01M 4/8657* (2013.01); *H01M 8/1213* (2013.01);
(Continued)

(58) Field of Classification Search
CPC .. H01M 4/861; H01M 8/2485; H01M 8/2425; H01M 8/1246; H01M 2300/0074;
(Continued)

(56) References Cited

U.S. PATENT DOCUMENTS 6,492,051 B1    12/2002  Gopalan et al.
2010/0167154 A1  7/2010  Ono
(Continued)

FOREIGN PATENT DOCUMENTS

JP     2007-59377 A    3/2007
JP     2015046365 A    3/2015

*Primary Examiner* — Lisa S Park
(74) *Attorney, Agent, or Firm* — Viering, Jentschura & Partner MBB

(57) ABSTRACT

A cell stack device includes a cell stack including a plurality of cells arranged, and a manifold configured to allow a reaction gas to be supplied to the plurality of cells. First end portions of the plurality of cells are fixed to the manifold with a sealing material. The plurality of cells each include: a supporting substrate extending in a length direction; an element portion including a fuel electrode, a solid electrolyte layer, and an air electrode layered on the supporting substrate; and an interlayer located between the solid electrolyte layer and the air electrode, extending to each of the first end portions of the plurality of cells, and having a porosity greater than a porosity of the solid electrolyte layer. The interlayer includes an exposed portion exposed from the air electrode at each of the first end portions of the plurality of cells and the sealing material provided on the exposed portion.

6 Claims, 6 Drawing Sheets

(51) Int. Cl.
*H01M 8/2485* (2016.01)
*H01M 8/2484* (2016.01)
*H01M 8/1213* (2016.01)
*H01M 8/243* (2016.01)
*H01M 8/1246* (2016.01)
H01M 8/0271 (2016.01)
H01M 8/00 (2016.01)
H01M 8/2475 (2016.01)
H01M 8/124 (2016.01)

(52) U.S. Cl.
CPC ......... *H01M 8/1246* (2013.01); *H01M 8/243* (2013.01); *H01M 8/2425* (2013.01); *H01M 8/2484* (2016.02); *H01M 8/2485* (2013.01); *H01M 8/004* (2013.01); *H01M 8/0271* (2013.01); *H01M 8/2475* (2013.01); *H01M 2008/1293* (2013.01); *H01M 2300/0074* (2013.01); *H01M 2300/0094* (2013.01); *Y02E 60/525* (2013.01)

(58) Field of Classification Search
CPC ....... H01M 2008/1293; H01M 8/2475; H01M 8/0271; H01M 4/8657; H01M 8/243; H01M 8/1213; H01M 8/2484; H01M 2300/0094; H01M 8/004; Y02E 60/525
See application file for complete search history.

(56) References Cited

U.S. PATENT DOCUMENTS

| | | |
|---|---|---|
| 2011/0003235 A1 | 1/2011 | Hwang et al. |
| 2011/0256464 A1* | 10/2011 | Muramatsu ......... H01M 4/8605 429/465 |
| 2012/0024461 A1* | 2/2012 | Gottmann ........... H01M 4/8885 156/89.12 |

* cited by examiner

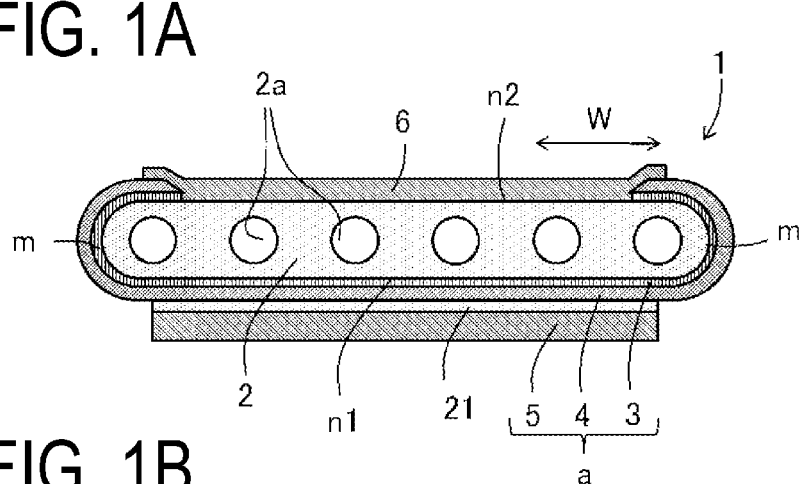
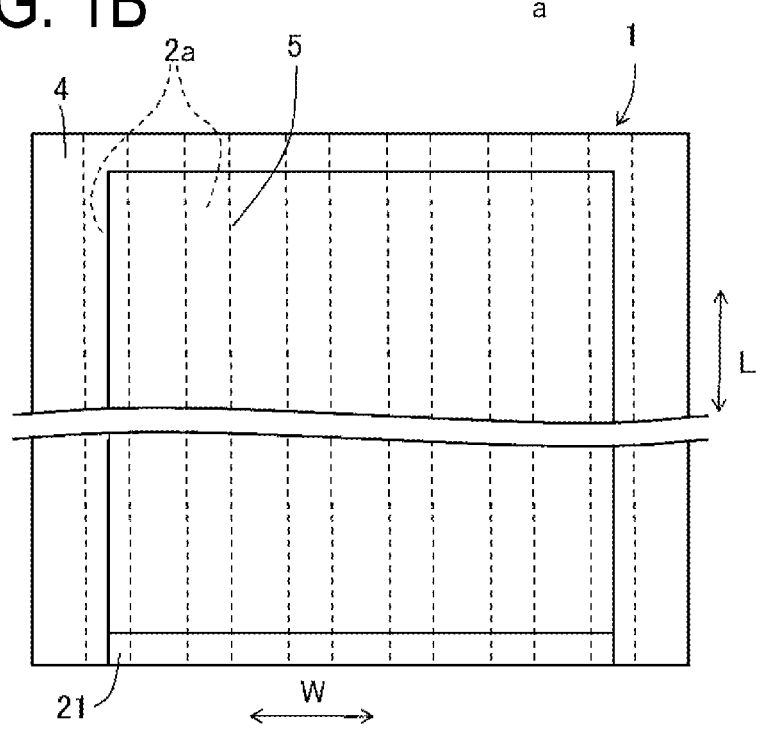

FIG. 4A
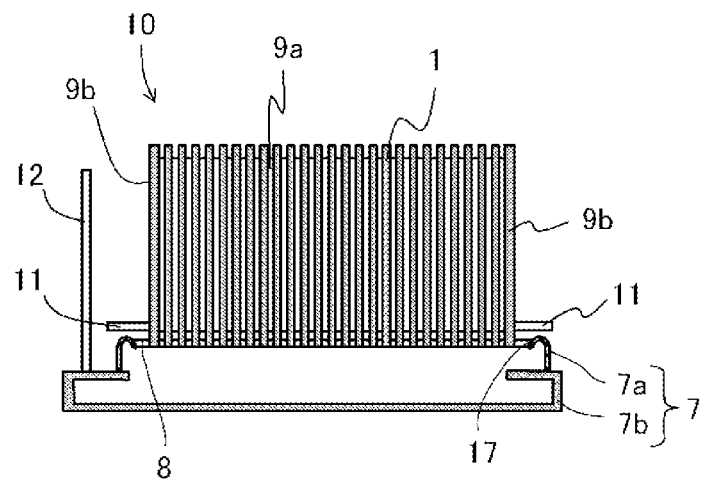
FIG. 4B
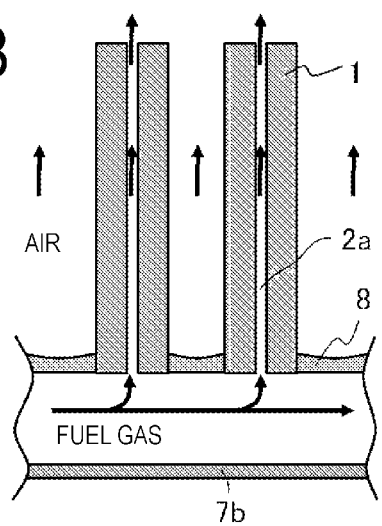
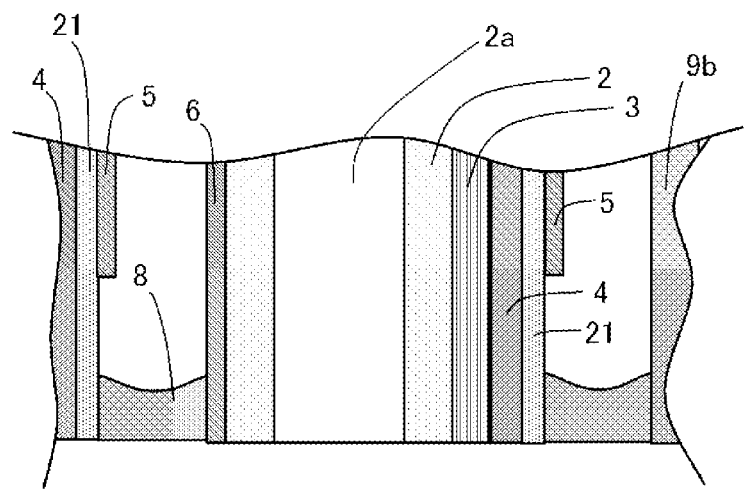
FIG. 5

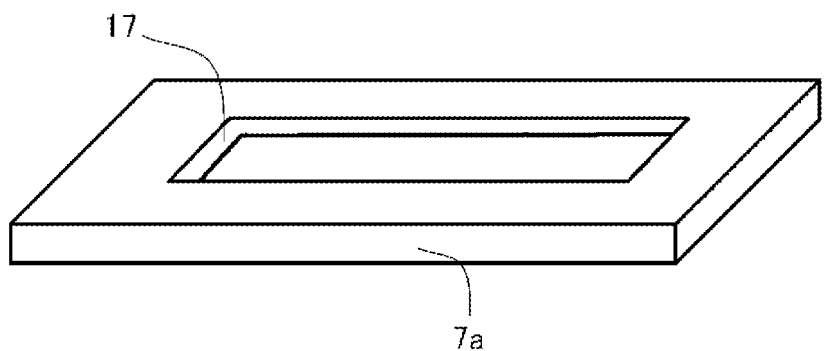
FIG. 8
FIG. 9A
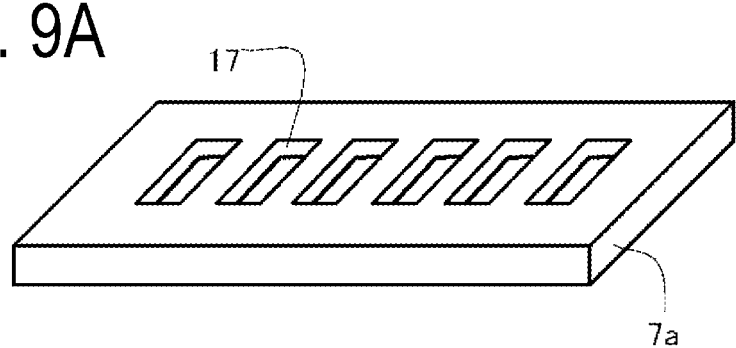
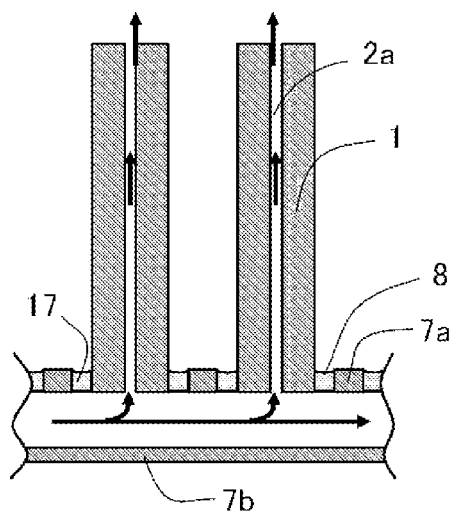
FIG. 9B

CELL STACK DEVICE, MODULE, AND MODULE HOUSING DEVICE

RELATED APPLICATIONS

The present application is a national stage entry according to 35 U.S.C. § 371 of PCT application No.: PCT/JP2016/072042 filed on Jul. 27, 2016, which claims priority from Japanese application No.: 2015-149739 filed on Jul. 29, 2015, is incorporated herein by reference in its entirety.

TECHNICAL FIELD

The present disclosure relates to a cell stack device, a module, and a module housing device.

BACKGROUND ART

In recent years, fuel cell modules that house a fuel cell stack device in a housing container, the fuel cell stack device being constituted by a plurality of fuel cells arranged, and fuel cell devices that each house the fuel cell module in an external casing have been proposed as next generation energy sources. The fuel cells are a type of cell capable of generating power using a fuel gas (hydrogen-containing gas) and an oxygen-containing gas (air) (e.g., Patent Literature 1).

CITATION LIST

Patent Literature

Patent Literature 1: JP 2007-59377 A

SUMMARY OF INVENTION

A cell stack device according to the present disclosure includes a cell stack including a plurality of cells arranged and a manifold. First end portions of the plurality of cells are fixed to the manifold with a sealing material; and the manifold is configured to allow a reactive gas to be supplied to the plurality of cells. The plurality of cells each include: a supporting substrate extending in a length direction, an element portion including a fuel electrode, a solid electrolyte layer, and an air electrode layered on the supporting substrate; an interlayer located between the solid electrolyte layer and the air electrode, extending to each of the first end portions of the plurality of cells, and having a porosity greater than a porosity of the solid electrolyte layer. The interlayer includes an exposed portion exposed from the air electrode at each of the first end portions of the plurality of cells. The sealing material is provided on the exposed portion.

A module of the present disclosure includes the above-described cell stack device housed in a housing container.

Furthermore, a module housing device according to the present disclosure includes: the module described above; and an auxiliary device configured to operate the module, the module and the auxiliary device being housed in an external casing.

BRIEF DESCRIPTION OF DRAWINGS

FIGS. 1A and 1B illustrate an example of a cell of the present embodiment. FIG. 1A is a horizontal cross-sectional view, and FIG. 1B is a side view.

FIG. 4A is a cross-sectional view of the example of the cell stack device of the present embodiment. FIG. 4B is an enlarged cross-sectional view illustrating, in an enlarged manner, part of the cross-sectional view of FIG. 4A.

FIG. 5 is an enlarged cross-sectional view illustrating a bonding portion between an insertion hole and a first end portion of the cell.

FIG. 8 is a perspective view illustrating another example of a supporting body of the present embodiment.

FIG. 9A is a perspective view illustrating another example of the supporting body of the present embodiment. FIG. 9B is an enlarged cross-sectional view illustrating the cell stack device including the supporting body illustrated in FIG. 9A.

DESCRIPTION OF EMBODIMENTS

A cell, a cell stack device, a module and a module housing device will be described using FIGS. 1A to 11.

Cell

Cells that constitute a cell stack will hereinafter be described by using an example of solid oxide fuel cells.

Figure 2:
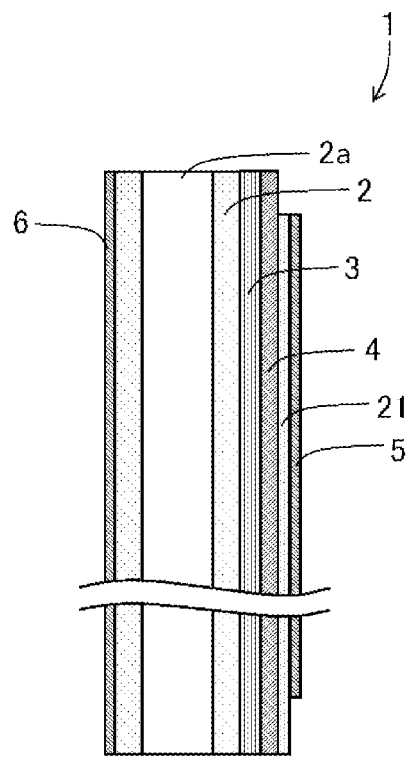
FIG. 2 illustrates a vertical cross-sectional view of the cell illustrated in FIGS. 1A and 1B.

FIGS. 1A and 1B illustrate an example of an embodiment of a cell. FIG. 1A is a horizontal cross-sectional view, and FIG. 1B is a side view. FIG. 2 illustrates a vertical cross-sectional view of the cell illustrated in FIGS. 1A and 1B. Here, FIGS. 1A to 2 illustrate individual parts of the configuration of the cell 1 in an enlarged manner.

The cell 1 of the example illustrated in FIG. 1A is hollow flat plate-shaped, and elongated. As illustrated in FIG. 1B, when the cell 1 is viewed from a side face in its entirety, the cell 1 is rectangular-shaped, from 5 to 50 cm in a length direction L, and from 1 to 10 cm in a width direction W orthogonal to this length direction. The total thickness of the cell 1 is from 1 to 5 mm.

As illustrated in FIG. 1A, the cell 1 includes an element portion a. The element portion a includes a fuel electrode 3, a solid electrolyte layer 4, and an air electrode 5, all of which are layered on a flat face n1, which is one of a pair of opposite flat faces n1 and n2 of a pillar-shaped (such as hollow plate-shaped) electrically conductive supporting substrate 2 (hereinafter may be abbreviated as a supporting substrate 2).

In the example illustrated in the FIG. 1A, an interconnector 6 is additionally provided on the flat face n2, which is the other of the flat faces of the cell 1.

As illustrated in FIG. 2, an interlayer 21 is located between the solid electrolyte layer 4 and the air electrode 5, and extends to a first end portion (a lower end portion) of the cell 1. The interlayer 21 is exposed from the air electrode 5 at the first end portion of the cell 1.

Descriptions of each member that constitutes the cell 1 will be given below.

Gas-flow passages 2a through which gas flows are formed in the supporting substrate 2. FIGS. 1A and 1B illustrate the example of the supporting substrate 2 with six gas-flow passages 2a.

The supporting substrate 2 is gas permeable to allow a fuel gas to permeate through to the fuel electrode 3, and electrically conductive in order to allow current collection via the interconnector 6.

The supporting substrate 2, for example, contains an iron group metal component and an inorganic oxide component. For example, the iron group metal component is Ni and/or NiO, and the inorganic oxide is a specific rare earth oxide. The specific rare earth oxide is used to bring the thermal expansion coefficient of the supporting substrate 2 close to that of the solid electrolyte layer 4. A rare earth oxide including at least one type of element selected from the group consisting of Y, Lu, Yb, Tm, Er, Ho, Dy, Gd, Sm, and Pr is used for example. A specific example of such a rare earth oxide includes: $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. Also, Ni and/or NiO and the rare earth oxide are present at a volume ratio of from 35:65 to 65:35 in the present embodiment, in terms of maintaining favorable electrical conductivity of the supporting substrate 2 and bringing the thermal expansion coefficient close to that of the solid electrolyte layer 4.

Also, in the cell 1 illustrated in FIGS. 1A and 1B, the pillar-shaped (hollow flat plate-shaped) supporting substrate 2 has an elongated plate shape that extends in an erecting direction, and includes the flat faces n1 and n2, and semi-circular side faces m.

Also, the supporting substrate 2 may have an open porosity of 30% or greater, and particularly from 35 to 50%. In addition, the electrical conductivity of the supporting substrate 2 may be 300 S/cm or greater, and particularly 440 S/cm or greater.

A well-known conventional material may be used for the fuel electrode 3. A porous electrically conductive ceramic, such as $ZrO_2$ (referred to as a stabilized zirconia, which also includes partially stabilized zirconia) and Ni and/or NiO each containing a rare earth element oxide that forms a solid solution together, may be used. This rare earth oxide may be, for example, $Y_2O_3$.

The solid electrolyte layer 4 functions as an electrolyte that allows electrons to move between the fuel electrode 3 and the air electrode 5, and has a gas blocking property that prevents leaks of the fuel gas and an oxygen-containing gas. The solid electrolyte layer 4 is, for example, formed of $ZrO_2$ forming a solid solution with from 3 to 15 mol % of the rare earth element oxide. This rare earth oxide may be, for example, $Y_2O_3$. Note that the solid electrolyte layer 4 may be formed from another material, provided that the other material exhibits the above-described properties.

The material for the air electrode 5 is not particularly limited to a specific material, and any well-known conventional material may be used. For example, an electrically conductive ceramic formed from a so-called $ABO_3$ perovskite-type oxide may be used for the air electrode 5. For example, a composite oxide that has both Sr-ions and La-ions as A-site ions may be used. An example of the composite oxide may include: $La_xSr_{1-x}Co_yFe_{1-y}O_3$, $La_xSr_{1-x}MnO_3$, $La_xSr_{1-x}FeO_3$, and $La_xSr_{1-x}CoO_3$, wherein X satisfies $0<x<1$, and Y satisfies $0<Y<1$. The air electrode 5 has gas permeability, and may have an open porosity of 20% or greater, and particularly from 30 to 50%.

A material such as a lanthanum chromite-based perovskite-type oxide ($LaCrO_3$-based oxide) or a lanthanum strontium titanium-based perovskite-type oxide ($LaSrTiO_3$-based oxide) may be used for the interconnector 6. These materials have electrically conductive properties and do not reduce or oxidize upon coming into contact with the fuel gas (a hydrogen-containing gas) or the oxygen-containing gas (air or the like). Moreover, the interconnector 6 is dense to prevent leaks of the fuel gas flowing through gas passages 2a formed inside the supporting substrate 2 as well as leaks of the oxygen-containing gas flowing outside the supporting substrate 2. The interconnector 6 has a relative density of 93% or greater, and particularly 95% or greater.

The interlayer 21 is formed of a $CeO_2$-based sintered body containing rare earth element oxide(s) other than oxides of Ce and, for example, has a composition formula that is represented by $(CeO_2)_{1-x}(REO_{1.5})_x$, wherein RE is at least one of Sm, Y, Yb, or Gd, and x is a number that satisfies $0<x\leq0.3$. The interlayer 21 suppresses a reaction between components of both the solid electrolyte layer 4 and the air electrode 5, at an interface of the solid electrolyte layer 4 and the air electrode 5. This reaction may cause generation of a reaction layer with high electric resistance. Namely, the interlayer 21 functions as an anti-reaction layer. The interlayer 21, for example, functions to suppress a reaction of Sr in the air electrode 5 and Zr in the solid electrolyte layer 4. Furthermore, Sm or Gd is preferably used as RE in terms of reducing electrical resistance. A $CeO_2$ forming a solid solution with from 10 to 20 mol % of $SmO_{1.5}$ or $GdO_{1.5}$, for example, may be used. The interlayer 9 may also have a two-layer construction.

Cell Stack Device

Next, descriptions of a cell stack device that is of the embodiment of the present disclosure and uses the above-described cells will now be given, by referring to FIGS. 3 to 4B.

Figure 3:
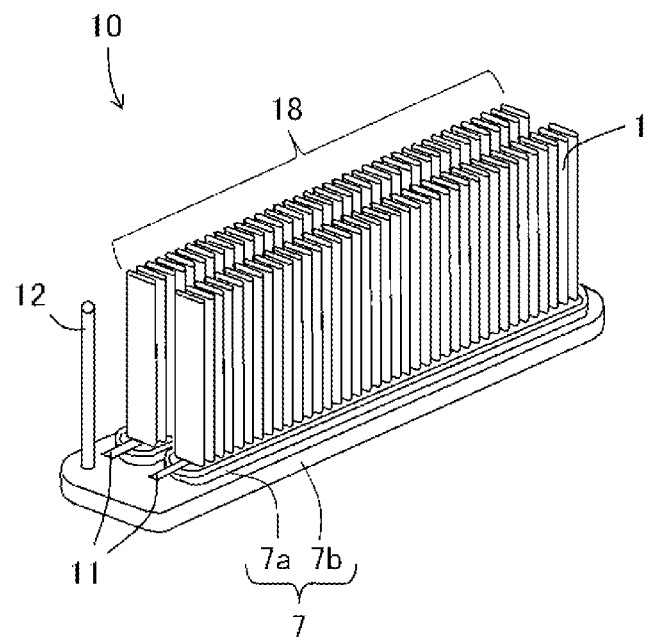
FIG. 3 is a perspective view illustrating an example of a cell stack device of the present embodiment.

FIG. 3 is a perspective view illustrating an example of a cell stack device of the present embodiment. FIG. 4A is a cross-sectional view of the example of the cell stack device of the present embodiment. FIG. 4B is an enlarged cross-sectional view illustrating, in an enlarged manner, part of the cross-sectional view of FIG. 4A.

The cell stack device 10 includes the plurality of cells 1 arranged and a manifold 7.

The first end portions of the plurality of cells 1 are fixed onto the manifold 7 with a sealing material 8. The manifold 7 allows a reactive gas to be supplied to the plurality of cells 1.

The manifold 7 of the example illustrated in FIGS. 3 to 4B includes supporting bodies 7a and a gas tank 7b. The fuel gas is stored in an internal space formed of these supporting bodies 7a and gas tank 7b. The gas tank 7b is provided with a gas distribution pipe 12. The fuel gas that is generated by a reformer 13 described below is provided to the manifold 7 via this gas distribution pipe 12, and subsequently to the gas-flow passages 2a inside the cells 1 from the manifold 7.

The cells 1 protrude from the manifold 7 in a longitudinal direction of the cells 1, and align in a manner that the flat face n1 of one of the cells 1 and the flat face n2 of the other of the cells 1 overlap and oppose (in a stacked manner). The first end portion in the longitudinal direction of the cells 1 are fixed to the supporting body 7a with the sealing material 8.

A lower end portion of the supporting body 7a of the example illustrated in FIGS. 3 to 4B is bonded to the gas tank 7b. This supporting body 7a has an insertion hole 17 that communicates with the internal space of the gas tank 7b. The first end portions of the plurality of cells 1 arranged in a line are inserted into this insertion hole 17.

In the example illustrated in FIGS. 3 to 4B, two lines each including the plurality of cells 1 are provided, and these lines are respectively fixed to the supporting bodies 7a. In this case, two through-holes are formed in an upper surface of the gas tank 7B. The supporting bodies 7a are provided such that each insertion hole 17 is aligned with a corresponding through-hole. The internal space is consequently formed by the one gas tank 7b and the two supporting bodies 7a.

The insertion holes 17, for example, have an elliptical shape in the top face view. The insertion holes 17 each desirably have a longer dimension in an arrangement direction of the cells 1 than a distance between a pair of end electrically conductive members 9b, for example. Also, the width of the insertion holes is desirably longer than the length of the cells 1 in a width direction W.

As illustrated in FIGS. 4A and 4B, gaps are formed between an inner wall of the insertion hole 17 and an exterior face of the cells 1 and between cells 1. As illustrated in FIGS. 4A and 4B, the gaps at the bonding portions of the insertion hole 17 and the first end portions of the cells 1 are packed with the solidified sealing material 8. The insertion hole 17 and the first end portions of the plurality of cells 1 are each bonded and fixed with this sealing material 8. As illustrated in FIG. 4B, one ends of the gas-flow passages 2a of each cell 1 communicate with the internal space of the manifold 7.

The sealing material 8 may include amorphous glass, brazing metal or the like, and crystallized glass may also be used. The crystallized glass may be, for example, $SiO_2$—$B_2O_3$, $SiO_2$—$CaO$, or $MgO$—$B_2O_3$, and $SiO_2$—$MgO$ is most preferable. Note that the crystallized glass in this specification refers to glass (ceramic) in which a proportion of "a volume of a crystal phase" to a total volume (crystallinity) is 60% or greater, and a proportion of "a volume of an amorphous phase and impurities" to a total volume is 40% or less. Crystallinity of crystallized glass is, for example, specifically determined as follows: identifying a crystal phase by X-Ray Diffraction (XRD) or any other measurement; observing distributions of structures and composition of crystallized glass by Scanning Electron Microscope (SEM) and Energy Dispersive X-ray Spectroscopy (EDS), or SEM and Electron Probe Micro Analyzer (EPMA); and calculating a proportion of a crystal phase by volume on the basis of the result of the observation.

Also, like the example illustrated in FIG. 4A, electrically conductive members 9a intervene between mutually adjacent cells 1. The electrically conductive members 9a allows an electrical series connection of the mutually adjacent cells 1 (more particularly between the fuel electrode 3 of one cell 1 and the air electrode 5 of the other cell 1). Note that the electrically conductive members 9a are not illustrated in the FIGS. 3, 4B, and 5.

Also, like the example illustrated in 4A, the end electrically conductive members 9b are connected to cells 1 located outermost in the arrangement direction among the plurality of cells 1. These end electrically conductive members 9b include an electrically conductive portion 11 protruding outward from the cell stack 5. The electrically conductive portion 11 functions to collect a current generated in power generation by the cells 1 and transmit the collected current outside.

The fuel gas (e.g., hydrogen) and "the oxygen-containing gas (e.g., air)" of high temperature (for example from 600 to 800° C.) flow as illustrated in FIG. 4B in a case that the cell stack device 10 of the fuel cells described above operates. The fuel gas is introduced into the internal space of the manifold 7, and subsequently introduced into each of the gas-flow passages 2a of the plurality of cells 1 via the insertion holes 17. The fuel gas that passed through each gas-flow passage 2a is discharged outside from a corresponding one of the other ends (free end). The air flows along the gaps between mutually adjacent cells 1 and along the longitudinal direction of the cells 1.

As illustrated in FIG. 5, the interlayer 21 with a porosity greater than that of the solid electrolyte layer 4 is exposed from the air electrode 5 at the first end portion of the cell 1 in the cell stack device of the present embodiment. The sealing material 8 is provided on this exposed portion. More specifically, the interlayer 21 of the cell 1 located at the most end side in an arrangement direction among the plurality of cells 1 are bonded to the end electrically conductive member 9b via the sealing material 8, like the example illustrated in FIG. 5. Also, each of the interlayers 21 of cells 1 other than the cell 1 located at the most end side is bonded to an adjacent cell 1 via the sealing material 8. Note that the interlayer 21 of the cell 1 located at the most end side may be bonded to the manifold 7 via the sealing material 8. In this case, the end electrically conductive members 9b are not bonded to the sealing material 8 and lower end portions of the end electrically conductive members 9b float from a surface of the sealing material 8.

This configuration allows the sealing material 8, before being solidified in a manufacturing process, to enter pores of the interlayers 21. The sealing material 8 conforms to the interlayers 21, leading to improved bonding strength. Accordingly, this improved bonding strength suppresses generation of gaps between the sealing material 8 and the interlayers 21. This prevents gas leaks, thus leading to improved long-term reliability.

The porosity described above may be measured according to the following processes. First, a so-called "resin-embedding" treatment is performed so that resin enters inside the pores of the entire cell 1. Mechanical polishing is performed on the flat faces n1 and n2 of the cell 1 that has undergone a "resin-embedding" treatment. This polishing allows exposure of cross-sections of the solid electrolyte layer 4 and the interlayer 2. Fine structure of the cross-sections is observed under SEM. By performing image processing for the obtained images, the area of pore part (the part embedded with resin) and the area of non-pore part (the part in which resin is not embedded) are each calculated. "The porosity" of the interlayer 21 and the solid electrolyte layer 4 are determined to be: a proportion of "the area of the pore part" to "the total area (a sum of the area of the pore part and the area of the non-pore part)". Note that in calculation of the porosity of the part of the interlayer 21 packed with the sealing material 8, the pores embedded with the sealing material 8 are taken into account as the pore part as well as the pores embedded with resin.

The porosity of the exposed portion of the interlayer 21 may be from 10 to 30%. Porosity of 10% or greater is high enough to contribute to entrance of the sealing material 8 into the interlayer 21, leading to improved bonding strength between both members. Porosity of 30% or less is not too high and prevents interlayer 21 from being damaged by stresses from the sealing material 8, in solidification of the sealing material 8 or under repeated power generations over a long period of time. Accordingly, gas leaks that may be caused by the damaged interlayer 21 may be suppressed.

Also, the exposed portion of the interlayer 21 may have a porosity greater than that of a portion of the interlayer 21 sandwiched between the solid electrolyte layer 4 and the air electrode 5. Relatively high porosity of the exposed portion of the interlayer 21 can improve bonding strength between the exposed portion and the sealing material 8. Also, relatively low porosity of the sandwiched portion between the solid electrolyte layer 4 and the air electrode 5 can improve the ability of the interlayer 21 as the anti-reaction layer.

Specifically, a porosity of the portion of the interlayer 21 sandwiched between the solid electrolyte layer 4 and the air electrode 5 may be from 5 to 25%. The interlayer 21 with a porosity of 5% or greater can relax stresses caused by difference in thermal expansion between the solid electrolyte layer 4 and the air electrode 5, under repeated power generations over a long period of time for example. Consequently, this interlayer 21 can prevent the solid electrolyte layer 4 from being damaged and thus suppress gas leaks. Difference in thermal expansion between the solid electrolyte layer 4 and the air electrode 5 increases, for example in a case where the solid electrolyte layer 4 is formed from $ZrO_2$ forming a solid solution with $Y_2O_3$ and the air electrode 5 is formed from $La_xSr_{1-x}Co_yFe_{1-y}O_3$. Porosity of 25% or less is not too high and can improve the ability of the interlayer 21 as the anti-reaction layer.

Manufacturing Method

Descriptions of an example of the method for manufacturing the cell 1 and the cell stack device 10 of the present embodiment described above will be given. Note that various conditions including, for example, materials, particle sizes, temperature, and a method of coating may be varied. Hereinafter, "a powder compact" refers to condition before firing.

First, for example, a green body is prepared by mixing Ni and/or NiO powder, powder of rare earth oxide(s) such as $Y_2O_3$, an organic binder, and a solvent. A supporting body powder compact is manufactured by extrusion molding using the green body, and the result is dried. Alternatively, a calcined body obtained by calcining the powder compact for from 2 to 6 hours at from 900 to 1000° C. may be used as the supporting body powder compact.

Next, for example, the raw materials of NiO and $ZrO_2$ (YSZ) forming a solid solution with $Y_2O_3$ are weighed and mixed in accordance with a predetermined compounding composition. After this, a fuel electrode slurry is prepared by mixing an organic binder and a solvent into the mixed powder.

Then, a slurry formed by adding toluene, a binder powder (for example, acrylic resin), a commercially-available dispersing agent, and the like to $ZrO_2$ powder forming a solid solution with $Y_2O_3$ is molded using a doctor blade method or the like to manufacture a sheet-shaped electrolyte layer powder compact.

A fuel electrode layer powder compact is formed by applying the slurry for the fuel electrode to the obtained sheet-shaped electrolyte layer powder compact, followed by drying the applied slurry. Thus, a sheet-shaped layered powder compact is formed. The fuel electrode powder compact-side face of the sheet-shaped layered powder compact consisting of the fuel electrode powder compact and the electrolyte layer powder compact layered together is layered on the supporting body powder compact, and thus a powder compact is formed.

Next, a slurry is prepared by mixing interconnector layer materials (for example, $LaCrMgO_3$-based oxide powder), an organic binder, and a solvent. The subsequent steps for the method for manufacturing the cell having a cohesion layer will be described.

Next, the interlayer arranged between the electrolyte layer and the air electrode is formed. For example, raw material powder for an interlayer powder compact is prepared by carrying out a thermal treatment at from 800 to 900° C. for from 2 to 6 hours on $CeO_2$ powder forming a solid solution with $GdO_{1.5}$. An interlayer slurry is produced by adding toluene as a solvent to this raw material powder, and the interlayer powder compact is produced by applying this slurry to the electrolyte layer powder compact. Additionally, in a case where the porosity of the exposed portion or the portion sandwiched between the solid electrolyte layer and the air electrode, of the interlayer is intended to be a predetermined value, preparing, as well as the above-described slurry, another slurry for the exposed portion containing a porous material with an adjusted amount is preferable.

After this, the interconnector layer slurry is applied on an upper face of the supporting body powder compact such that both end portions of the interconnector layer powder compact are layered on both end portions of the electrolyte layer powder compact respectively. Thus, a layered powder compact is produced.

Next, the layered powder compact described above is subjected to a binder removal treatment, and co-sintering (co-firing) is carried out in an oxygen-containing atmosphere at from 1400 to 1450° C. for from 2 to 6 hours.

Subsequently, an air electrode slurry is prepared by mixing, for example, $La_xSr_{1-x}Co_yFe_{1-y}O_3$ (hereinafter simply referred to as LSCF) powder with a predetermined particle size, an organic binder, a pore-imparting agent, and a solvent. This slurry is applied on the interlayer by screen-printing, thus an air electrode powder compact is formed.

Next, a layered body in which the air electrode powder compact is formed on the interlayer is subjected to firing at from 1100 to 1200° C. for from 1 to 3 hours. Thus, the cell 1 having the configuration illustrated in FIGS. 1A and 1B may be manufactured.

Thereafter, in the cell 1, preferably, hydrogen gas is supplied into the gas-flow passages and the supporting substrate 2 and the fuel electrode 8 are subjected to a reducing treatment. The reducing treatment is, for example, preferably carried out at from 750 to 1000° C. for from 5 to 20 hours.

Furthermore, the cell stack device 10 described above is assembled by following procedures. First, a required number of the cells 1 finished and the supporting body 7a are prepared. Next, the plurality of cells 1 are arranged in a stacked manner and fixed by a certain jig or any other tool. Next, while this stack is kept, the first end portions of the plurality of cells 1 are inserted into the insertion hole 17 of the supporting body 7a at a time. Next, the gaps at the bonding portions of the insertion hole 17 and the first end portions of the plurality of cells 1 are packed with paste of the sealing material 8 (typically is an amorphous material (amorphous glass)). At this time, the amorphous material enters the pore part of the interlayer 21.

Next, the paste of the sealing material 8 packed as described above is subjected to a thermal treatment (crystallization treatment). When the temperature of the amorphous material reaches the crystallization temperature of the material in this thermal treatment, a crystalline phase is generated inside the material and crystallization proceeds at the crystallization temperature. Consequently, the amorphous material is solidified and converted into ceramic, thus transforms into crystallized glass. By this process, the first end portions of the plurality of cells 1 are fixed and bonded to the insertion hole 17 via the sealing material 8 composed of the crystallized glass. In other words, the first end portion of each cell 1 is bonded to and supported by the supporting body 7a by using the sealing material 8. After that, the jig is removed from the plurality of cells 1.

Subsequently, the supporting bodies 7a are bonded to the gas tank 7b, thus the cell stack device 10 is completely manufactured.

Module

Figure 6:
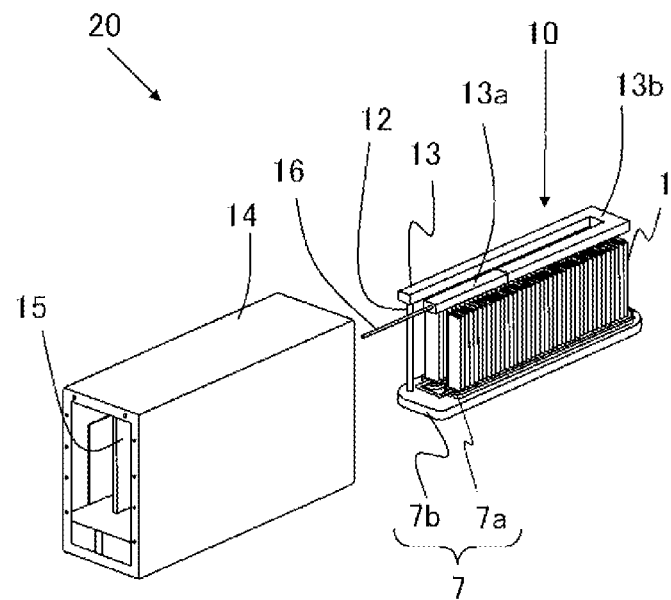
FIG. 6 is an exterior perspective view illustrating a module including the example of the cell stack device of the present embodiment.

Next, descriptions of the module that is of the embodiment of the present disclosure and uses the above-described cell stack device will now be given, by referring to FIG. 6. FIG. 6 is an exterior perspective view illustrating a module including the example of the cell stack device of the present embodiment.

As illustrated in FIG. 6, the module 20 includes the cell stack device 10 and a housing container 14 configured to house the cell stack device 10. A reformer 13 configured to generate fuel gas to be supplied to the cells 1 is disposed above the cell stack device 10.

Moreover, the reformer 13 illustrated in FIG. 6 is configured to reform a raw fuel such as natural gas or kerosene supplied via a raw fuel supply pipe 16 to produce the fuel gas. The reformer 13 preferably has a structure that enables steam reforming, which is an efficient reformation reaction. The reformer 22 includes a vaporizing unit 13a configured to vaporize water and a reforming unit 13b including a reforming catalyst (not illustrated) for reforming the raw fuel into the fuel gas. Then, the fuel gas produced in the reformer 13 is supplied to the manifold 7 via the fuel gas distribution pipe 12. The fuel gas is then supplied via the manifold 7 to the gas-flow passages formed inside the cells 1.

Moreover, FIG. 6 illustrates the cell stack device 10, which is typically housed in the housing container 14. In the FIG. 6, however, the cell stack device 10 is extracted rearward and portions of the housing container 14 (front and back faces) are being removed.

Note that during normal power generation, the module 20 has an inner temperature of approximately from 500 to 1000° C. due to combustion process and power generation in the cells 1.

As described above, the module 20, which houses the cell stack device 10 that has improved long-term reliability, can have improved long-term reliability.

Module Housing Device

Figure 7:
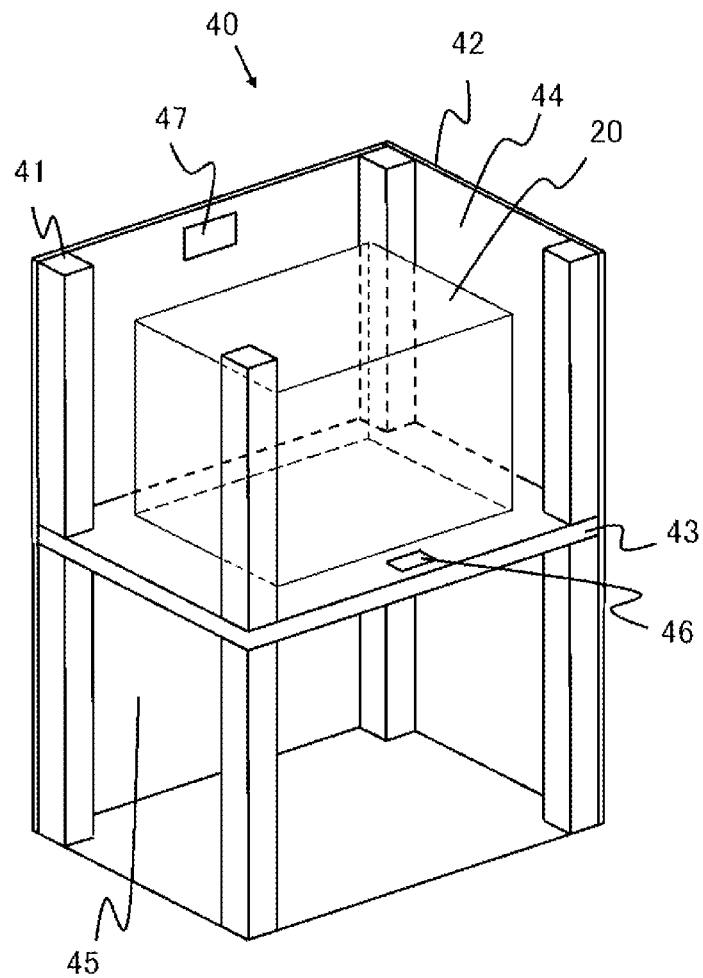
FIG. 7 is an exploded perspective view schematically illustrating an example of a module housing device of the present embodiment.

FIG. 7 is an exploded perspective view illustrating an example of a module housing device according to the present embodiment. The module housing device includes: the module 20 illustrated in FIG. 6; an auxiliary device (not illustrated) configured to operate the module 20; and an external casing that houses the module 20 and the auxiliary device. Note that some of the components of the configuration are omitted in FIG. 7.

In the module housing device 40 illustrated in FIG. 7, the external casing formed using supports 41 and exterior plates 42 is divided into an upper and a lower region using a dividing plate 43. The upper region forms a module housing chamber 44 that houses the module 20. The lower region forms an auxiliary device housing chamber 45 that houses the auxiliary device configured to operate the module 20. Note that the auxiliary device housed in the auxiliary device housing chamber 45 is not illustrated in FIG. 7.

Furthermore, an airflow hole 46 is formed in the dividing plate 43. This air flow hole 46 allows air in the auxiliary device housing chamber 45 to flow into the module housing chamber 44. Additionally, an exhaust hole 47 is formed in one of the outer plates 42 of the module housing chamber 44. Air is exhausted out of the module housing chamber 44 through this exhaust hole 47.

In this module housing device 40, the module 20 having improved long-term reliability, as described above, is housed in the module housing chamber 44, and the auxiliary device configured to operate the module 20 is housed in the auxiliary device housing chamber 45. This configuration enables providing a module housing device 40 having improved long-term reliability.

The present disclosure has been described in detail above. However, the present disclosure is not limited to the embodiments described above, and various modifications or improvements can be made without departing from the essential spirit of the present disclosure.

In this embodiment, a so-called "vertically striped" configuration, where the single element portion a is provided on the face of the supporting substrate 2, is adopted. The element portion a includes the inner electrode (fuel electrode) 3, the solid electrolyte layer 4, and the outer electrode (air electrode) 5. However, cells of a so-called "horizontal striped" configuration, where a plurality of the element portions a are provided on separate individual portions of the face of the supporting substrate 2 and mutually adjacent element portions a are electrically connected, may be adopted.

Also, the supporting substrate 2 of the embodiment described above has a flat plate shape. However, the supporting substrate 2 may have a cylindrical shape. In this case, interior spaces of the supporting substrate 2 of a cylindrical shape functions as gas-flow passages 2a.

In the cells 1 of the embodiment described above, the fuel electrode 3 and the air electrode 5 may be switched. Namely, the inner electrode may be the air electrode 5 and the outer electrode may be the fuel electrode 3. In this case, a gas flow configuration where the fuel gas and the air flows are switched is adopted.

Furthermore, on a premise that the supporting substrate 2 doubles as the fuel electrode 3, the cell 1 may be formed by layering the solid electrolyte layer 4 and the air electrode 5 on the face of the supporting substrate 2.

Also, the supporting body 7a of the embodiment described above is a tubular body as illustrated in FIG. 4A. However, the supporting body 7a may be a flat plate shape as illustrated in FIG. 8. In this case, an internal space may be formed by bonding the gas tank 7b to the bottom face of the supporting body 7a having the flat plate shape.

Also, as illustrated in FIG. 4A, all the first end portions of the plurality of cells 1 in one line are inserted into the single insertion hole 17 formed in the supporting body 7a in the embodiment described above. However, as illustrated in FIG. 9A, the cells 1 may be inserted into a plurality of insertion holes 17 formed on the supporting body 7a in a one-by-one manner. In this case, each interlayer 21 of all the cells 1 is bonded to the supporting body 7a of the manifold 7. Furthermore, a group of the cells 1 may be inserted into each of the plurality of insertion holes formed on the supporting body 7a.

Also, the supporting bodies and the gas tank of the embodiment described above are configured as separate bodies. However, provided that the internal space of the manifold and the gas-flow passages of the plurality of cells communicate, the supporting bodies and the gas tank may be integrally formed.

Figure 10:
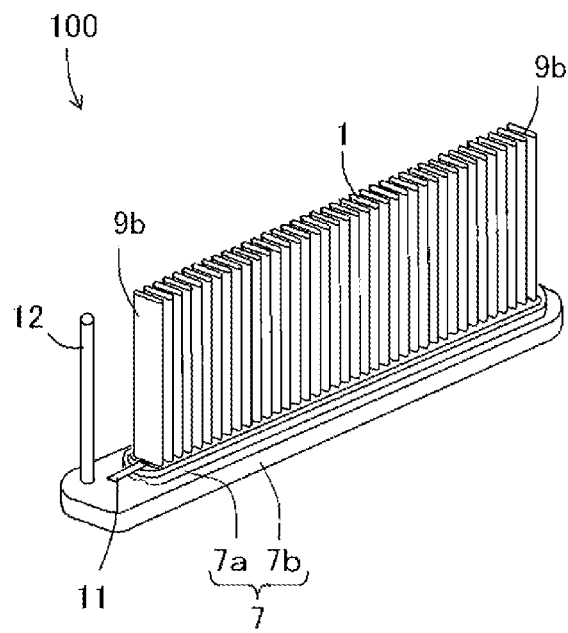
FIG. 10 is a perspective view illustrating another example of the cell stack device of the present embodiment.

Also, as illustrated in FIG. 3, the cell stack device of the embodiment described above is illustrated. The cell stack device includes the plurality of cells arranged in two lines. However as illustrated in FIG. 10, the cell stack device may include a plurality of cells arranged in a single line.

Also, the fuel cell, the fuel cell stack device, the fuel cell module, and the fuel cell device are respectively illustrated as an example of "a cell", "a cell stack device", "a module", and "module housing device". However, in another example, the fuel cell, the fuel cell stack device, the fuel cell module, and the fuel cell device may be "an electrolysis cell", "an electrolysis cell stack device", "an electrolysis module" and "an electrolysis device", respectively.

Figure 11:
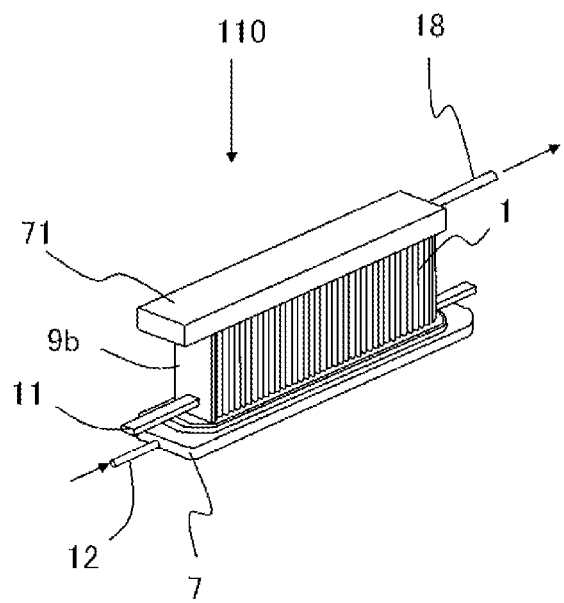
FIG. 11 is a perspective view illustrating yet another example of the cell stack device of the present embodiment.

FIG. 11 illustrates an example of the electrolysis cell stack device. Each second end portion (upper end portion) of the cells 1 is bonded to another manifold 71 with the sealing material 8. The manifold 7 serves as a supply portion for supplying steam of high temperature while the other manifold 71 serves as a collection portion for collecting generated hydrogen. In an example illustrated in FIG. 11, a gas distribution pipe 12 allows steam to be supplied while a gas distribution pipe 18 allows hydrogen to be collected.

EXAMPLES

Sample Preparation

A plurality of samples of the above-described cell stack device (see FIG. 3) each having the interlayer with different porosity were prepared according to the above-described manufacturing method. Specifically, 10 samples (N=10) were prepared, as indicated in Table 1.

The cell stack device samples each included 30 cells. The shapes of the cells serving as the samples had a plate shape similar to that of the cells illustrated in FIGS. 1A to 2. The cells and the cell stack devices were manufactured in the same way as described above. The cells were 20 cm long in the longitudinal direction, 20 mm wide in the width direction, and 2 mm thick. An elliptical shape was adopted as the shape of the insertion holes of the supporting body, which was the same as the FIGS. 3 to 4B. A $SiO_2$—MgO—$B_2O_5$—$Al_2O_3$-based material was used as the sealing material. The supporting body (manifold) of stainless steel was used.

Measurement of Porosity

Next, the porosity of the interlayers and the solid electrolyte layers of the cell stack devices produced as described above was measured. The results are shown in Table 1.

Measurements were performed after tests that will be described below. As described above, the "resin-embedding" treatment was performed, followed by mechanical polishing. Subsequently fine structure of the cross-section was observed under SEM and areal proportions were calculated.

Gas Leak Test

A heat cycle test was performed on each sample described above. This test consisted of 10 cycles of: elevating the surrounding temperature from ambient temperature to 750° C. in an hour; and lowering the surrounding temperature from 750° C. to ambient temperature in two hours.

After this test, helium gas was allowed to flow through inside the gas tank. Subsequently, a hand-held leak detector was brought close to each cell and the cell was checked for gas leaks at the bonding portion between the sealing material and the cell. The presence or absence of leaks of helium gas was thus determined. The number of cells from which gas leaked was counted. The results are shown in Table 1. Notations "Excellent", "Good", "Marginal", and "Poor" indicated that the number of cells from which gas leaked is 0, from 1 to 2, from 3 to 4, and 5 or greater, respectively.

Power Generation Capability Test

Power density of the cell stack device at an initial stage of power generation (0.3 $A/cm^3$, 750° C.) was measured on samples that had the same porosity as those of the samples used in the gas leak tests described above and were different from these samples. Subsequently, an accelerated test was performed at 1000° C. for 1000 hours to measure decreasing ratio of the power density of each of the cell stack devices after 1000-hour operation, to the power density at an initial stage of power generation. These ratios are indicated as "power density decreasing ratio" and the results of them are shown in Table 1.

TABLE 1

| Sample No. | Porosity (%) | | | Leak evaluation | Power density decreasing ratio (%) |
|---|---|---|---|---|---|
| | Protruded portion of interlayer | Solid electrolyte layer | Sandwiched portion of interlayer between solid electrolyte layer and air electrode | | |
| 1 | 1.1 | 2.0 | 2.1 | Poor | 1.2 |
| 2 | 5.2 | 2.1 | 3.2 | Marginal | 1.2 |
| 3 | 10 | 2.0 | 4.3 | Good | 1.3 |
| 4 | 10 | 2.2 | 5.0 | Excellent | 1.3 |
| 5 | 15 | 2.1 | 10 | Excellent | 1.4 |
| 6 | 20 | 2.2 | 15 | Excellent | 1.4 |
| 7 | 25 | 2.0 | 20 | Excellent | 1.4 |
| 8 | 30 | 2.1 | 25 | Excellent | 1.5 |
| 9 | 30 | 2.0 | 26 | Excellent | 5.0 |
| 10 | 31 | 2.2 | 26 | Marginal | 5.0 |

Gas Leak Test Results

As is clear from Table 1, Sample No. 1 included a large number of cells from which gas leaked. This is because the porosity of the interlayer was less than that of the solid electrolyte layer at the first end portion of the cell.

On the other hand, Samples Nos. 2 and 10 included a small number of cells from which gas leaked as compared to Sample No. 1. This is because the porosity of the interlayer was greater than that of the solid electrolyte layer at the first end portion of the cell.

Furthermore, Samples Nos. 3 to 9 included a small number of cells from which gas leaked as compared to Sample Nos. 2 and 10. This is because the porosity of the exposed portion of the interlayer was from 10% to 30%. Among them, Samples Nos. 4 to 9 included a small number of cells from which gas leaked as compared to Sample No. 3. This is because the porosity of the portion of the interlayer sandwiched between the solid electrolyte layer and the air electrode was 5% or greater.

Power Generation Capability Test Result

As is clear from Table. 1, Samples Nos. 2 to 8, excluding Sample No. 1 with "Poor", showed small power density decreasing ratios compared to Samples Nos. 9 and 10 in leak evaluation. This is because the porosity of the portion of the interlayer sandwiched between the solid electrolyte layer and the air electrode was 25% or less.

Note that it was confirmed that the same results were obtained as the results described above in a case where a $SiO_2$—$MgO$—$B_2O_5$—$ZnO$-based sealing material was used.

REFERENCE SIGNS LIST

1 Cell
2 Supporting substrate
2a Gas-flow passage
3 Fuel electrode (inner electrode)
4 Solid electrolyte layer
5 Air electrode (outer electrode)
6 Interconnector
7 Manifold
7a Supporting body
7b Gas tank
8 Sealing material
9a Electrically conductive member
9b End electrically conductive member
10, 100, and 110 Cell stack device
11 Electrically conductive portion
12 Gas distribution pipe
13 Reformer
14 Housing container
15 Air introduction member
16 Raw fuel supply pipe
20 Module
21 Interlayer
40 Module housing device

What is claimed is:

1. A cell stack device comprising:
a cell stack comprising a plurality of cells arranged; and
a manifold configured to allow a reactive gas to be supplied to the plurality of cells, first end portions of the plurality of cells being fixed to the manifold with a sealing material;
wherein each of the plurality of cells comprises:
a supporting substrate extending in a length direction,
an element portion comprising a fuel electrode, a solid electrolyte layer, and an air electrode layered on the supporting substrate, and
an interlayer comprising a first surface, the interlayer located between the solid electrolyte layer and the air electrode, extending to each of the first end portions of the plurality of cells, and having a porosity greater than a porosity of the solid electrolyte layer, and
the interlayer comprises:
a sandwiched portion sandwiched between the solid electrolyte layer and the air electrode with the air electrode layer covering the first surface and
an exposed portion extending along the length direction beyond the sandwiched portion, the first surface exposed from the air electrode at a first end portion of each of the plurality of cells and the sealing material provided on the exposed portion.

2. The cell stack device according to claim 1, wherein the exposed portion of the interlayer has a porosity of from 10 to 30%.

3. The cell stack device according to claim 1, wherein the exposed portion of the interlayer has a porosity greater than a porosity of the sandwiched portion.

4. The cell stack device according to claim 1, wherein the sandwiched portion has a porosity of from 5 to 25%.

5. A module comprising:
a housing container; and
the cell stack device according to claim 1, the cell stack device being housed in the housing container.

6. A module housing device comprising:
an external casing;
the module according to claim 5, the module being housed in the external casing; and
an auxiliary device configured to operate the module, the auxiliary device being housed in the external casing.

* * * * *